United States Patent
Choung et al.

(10) Patent No.: US 10,753,291 B1
(45) Date of Patent: Aug. 25, 2020

(54) SYSTEM AND METHOD OF CONTROLLING ENGINE PROVIDED WITH DUAL CONTINUOUSLY VARIABLE VALVE DURATION DEVICE

(71) Applicants: Hyundai Motor Company, Seoul (KR); Kia Motors Corporation, Seoul (KR)

(72) Inventors: Jin Woo Choung, Suwon-si (KR); Kiyoung Kwon, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/539,400

(22) Filed: Aug. 13, 2019

(30) Foreign Application Priority Data

May 13, 2019 (KR) .................. 10-2019-0055449

(51) Int. Cl.
*F02D 37/02* (2006.01)
*F01N 9/00* (2006.01)
(Continued)

(52) U.S. Cl.
CPC ............. *F02D 37/02* (2013.01); *F01N 3/101* (2013.01); *F01N 3/18* (2013.01); *F01N 9/00* (2013.01); *F02D 9/08* (2013.01)

(58) Field of Classification Search
CPC ........... F01N 2430/08; F01N 2430/085; F01N 2430/10; F01N 3/101; F01N 3/18;
(Continued)

(56) References Cited

U.S. PATENT DOCUMENTS

| 4,218,880 A * | 8/1980 | Kuroda | F01N 3/18 |
| | | | 123/568.2 |
| 6,477,831 B1 * | 11/2002 | Ballinger | F01N 3/00 |
| | | | 60/274 |

(Continued)

FOREIGN PATENT DOCUMENTS

KR 10-1619394 B1 5/2016

*Primary Examiner* — Mark A Laurenzi
*Assistant Examiner* — Mickey H France
(74) *Attorney, Agent, or Firm* — Morgan, Lewis & Bockius LLP

(57) ABSTRACT

A system of controlling an engine provided with a dual continuously variable valve duration device may include the engine including a combustion chamber, an intake valve, an ignition switch provided in the combustion chamber, and an exhaust valve, the CVVD provided to adjust an intake duration of the intake valve and an exhaust duration of the exhaust valve, a warm-up catalytic converter (WCC) including a three-way catalyst (TWC) for purifying hydrocarbons, carbon monoxide, nitrogen oxides contained in the exhaust gas downstream of the engine, a Hydrocarbon (HC) trap disposed downstream of the warm-up catalytic converter for adsorbing and removing the hydrocarbons contained in the exhaust gas, an electrically heated catalyst disposed downstream of the HC trap and provided with a heating device, a three-way catalyst (TWC) disposed downstream of the electrically heated catalyst for purifying hydrocarbons, carbon monoxide, and nitrogen oxides contained in the exhaust gas, and a controller for adjusting an ignition timing of the ignition switch, the intake duration and the exhaust duration based on a driving condition of the vehicle.

11 Claims, 13 Drawing Sheets

(51) Int. Cl.
*F01N 3/10* (2006.01)
*F01N 3/18* (2006.01)
*F02D 9/08* (2006.01)

(58) Field of Classification Search
CPC ........ F01N 3/20; F01N 3/2006; F01N 3/2013;
F01N 3/2026; F01N 2240/16; F01N
2390/00–08
USPC ......... 60/273, 274, 284, 285, 289–292, 294,
60/300, 303, 312; 123/90.15, 90.16,
123/90.17
See application file for complete search history.

(56) References Cited

U.S. PATENT DOCUMENTS

| | | | | |
|---|---|---|---|---|
| 6,928,988 | B2* | 8/2005 | Nishigaki | F02B 75/22 123/198 F |
| 7,357,901 | B2* | 4/2008 | Nakatani | F01N 3/0842 422/105 |
| 7,529,614 | B1* | 5/2009 | Muller | F02B 37/16 123/559.1 |
| 7,588,002 | B2* | 9/2009 | Wygnanski | F01L 1/185 123/90.11 |
| 8,800,510 | B2* | 8/2014 | Carlson | F02B 33/44 123/90.14 |
| 10,385,797 | B2* | 8/2019 | Hutchins | F02D 41/263 |
| 2002/0062687 | A1* | 5/2002 | Reed | F02D 41/1401 73/114.01 |
| 2002/0144501 | A1* | 10/2002 | Uedahira | F02D 41/1465 60/278 |
| 2003/0079468 | A1* | 5/2003 | Yamamoto | F01N 3/0835 60/297 |
| 2004/0083716 | A1* | 5/2004 | Twigg | F01N 3/2006 60/284 |
| 2005/0204726 | A1* | 9/2005 | Lewis | F02D 13/06 60/285 |
| 2005/0204727 | A1* | 9/2005 | Lewis | F02D 41/0087 60/285 |
| 2007/0157604 | A1* | 7/2007 | Kakuya | F02M 27/04 60/285 |
| 2009/0018753 | A1* | 1/2009 | Muller | F02D 41/1448 701/103 |
| 2009/0049897 | A1* | 2/2009 | Olin | F02D 41/185 73/114.32 |
| 2009/0090106 | A1* | 4/2009 | Muller | F02B 37/12 60/602 |
| 2009/0094009 | A1* | 4/2009 | Muller | F02D 41/1445 703/7 |
| 2009/0308070 | A1* | 12/2009 | Alger, II | F02D 13/0261 60/602 |
| 2010/0024751 | A1* | 2/2010 | Yi | F01L 1/34 123/90.12 |
| 2010/0122679 | A1* | 5/2010 | Lee | F01L 1/34 123/90.33 |
| 2010/0313862 | A1* | 12/2010 | Lee | F02D 41/1446 123/676 |
| 2013/0245921 | A1* | 9/2013 | Glugla | F02D 41/0097 701/105 |
| 2013/0306012 | A1* | 11/2013 | Hamamoto | F01L 1/34 123/90.15 |
| 2014/0007561 | A1* | 1/2014 | Habu | B60W 20/16 60/277 |
| 2014/0069080 | A1* | 3/2014 | Leone | F02D 41/064 60/274 |
| 2015/0007787 | A1* | 1/2015 | Oh | F02D 13/0215 123/90.15 |
| 2015/0040876 | A1* | 2/2015 | Cleeves | F02D 41/0245 123/568.14 |
| 2015/0204249 | A1* | 7/2015 | Glugla | F02B 37/183 123/90.15 |
| 2015/0252742 | A1* | 9/2015 | Stroh | F02N 11/0814 60/274 |
| 2016/0040607 | A1* | 2/2016 | Ku | F02M 26/07 123/568.17 |
| 2016/0131046 | A1* | 5/2016 | Leone | F02B 37/004 60/600 |
| 2016/0131054 | A1* | 5/2016 | Ulrey | F02D 29/06 60/600 |
| 2016/0230618 | A1* | 8/2016 | Hoglund | F01L 9/02 |
| 2016/0237864 | A1* | 8/2016 | Hoglund | F01L 9/02 |
| 2016/0237866 | A1* | 8/2016 | Hoglund | F01L 9/026 |
| 2016/0369709 | A1* | 12/2016 | Choi | F02M 26/41 |
| 2017/0037750 | A1* | 2/2017 | Hoglund | F01L 9/02 |
| 2017/0037786 | A1* | 2/2017 | Fabien | F02B 37/183 |
| 2017/0248056 | A1* | 8/2017 | Styles | F01N 5/02 |
| 2018/0171887 | A1* | 6/2018 | Ulrey | F02D 13/0261 |
| 2018/0171892 | A1* | 6/2018 | Nakagawa | F02D 45/00 |
| 2018/0171910 | A1* | 6/2018 | Tanaka | B01D 53/9422 |
| 2019/0032585 | A1* | 1/2019 | Kelly | F01N 3/0236 |
| 2019/0113008 | A1* | 4/2019 | Park | F02M 26/01 |
| 2019/0293010 | A1* | 9/2019 | Madison | F02D 13/0257 |
| 2019/0301383 | A1* | 10/2019 | Ulrey | F02D 13/0257 |
| 2019/0383188 | A1* | 12/2019 | Paukner | F01N 3/101 |
| 2020/0018215 | A1* | 1/2020 | Park | B01D 53/9454 |
| 2020/0122709 | A1* | 4/2020 | Cunningham | F01N 13/107 |
| 2020/0132003 | A1* | 4/2020 | Hoglund | F02B 37/02 |
| 2020/0173375 | A1* | 6/2020 | Choung | F02P 5/1502 |
| 2020/0173376 | A1* | 6/2020 | Choung | F02D 13/0219 |
| 2020/0173385 | A1* | 6/2020 | Choung | F02D 41/0295 |

\* cited by examiner

SYSTEM AND METHOD OF CONTROLLING ENGINE PROVIDED WITH DUAL CONTINUOUSLY VARIABLE VALVE DURATION DEVICE

CROSS-REFERENCE TO RELATED APPLICATION

The present application claims priority to Korean Patent Application No. 10-2019-0055449 filed on May 13, 2019, the entire contents of which is incorporated herein for all purposes by this reference.

BACKGROUND OF THE INVENTION

Field of the Invention

The present invention relates to a system and method of controlling engine provided with dual continuously variable valve duration device. More particularly, the present invention relates to a system and method of controlling engine provided with dual continuously variable valve duration device for reducing emissions (EM) contained in the exhaust gas by changing control method depending on the presence or absence of a three-way catalyst (TWC) which has enhanced low temperature nitrogen oxide (NOx) purification function of a warm-up catalytic converter (WCC).

Description of Related Art

Generally, an internal combustion engine generates a power by taking fuel and air into a combustion chamber and burning it. When the air is drawn, the intake valves are actuated by driving a camshaft, and the air is drawn into the combustion chamber while the intake valve is opened. Furthermore, by driving the camshaft, an exhaust valve is operated and the exhaust gas is discharged from the combustion chamber while the exhaust valve is opened.

However, the optimum intake valve/exhaust valve operation depends on the rotation speed of the engine. That is, an appropriate lift or valve opening/closing time depends on the rotation speed of the engine. To realize an appropriate valve operation in accordance with the rotation speed of the engine, a plurality of cams for driving the valve are designed, or a continuously variable valve lift that implements the valve to operate with a different lift according to the engine speed continuous variable valve lift (CVVL) devices have been studied.

Furthermore, continuous variable valve timing (CVVT) technology has been developed by adjusting the opening time of the valve, which is a technique in which the valve opening/closing timing is changed at the same time with the valve duration fixed.

In recent years, there has been developed a technique for controlling a period in which a valve is opened (i.e., a valve duration) based on a driving condition of a vehicle, and has been applied to a vehicle.

On the other hand, the vehicle is provided with a catalytic converter to reduce the emissions contained in the exhaust gas. The exhaust gas discharged from the engine through the exhaust manifold is guided to the catalytic converter mounted in the exhaust pipe and purified. The exhaust gas passes through the muffler to attenuate the noise, and is discharged to the atmosphere through the tail pipe. The catalytic converter described above purifies the emissions contained in the exhaust gas. A soot filter for collecting particulate matters (PM) contained in the exhaust gas may be mounted on the exhaust pipe.

The three-way catalyst TWC is a type of the catalytic converter and reacts with hydrocarbon compounds, carbon monoxide, and nitrogen oxide (NOx)s (NOx), which are harmful components of exhaust gas, to remove these compounds. Pt/Rh, Pd/Rh or Pt/Pd/Rh system is used for the three-way catalyst mainly in gasoline vehicles.

In order for the three-way catalyst to purify the effluent contained in the exhaust gas, the temperature of the three-way catalyst must be higher than the activation temperature, and generally, a warm-up catalytic converter (WCC) including the three-way catalyst is used to rapidly raise the temperature of the exhaust gas.

There is a problem that the temperature of the three-way catalyst is low at the initial stage of the start of the vehicle, and the exhaust cannot be purified and discharged to the outside of the vehicle. Accordingly, a three-way catalyst with enhanced nitrogen oxide (NOx) purification function in the low temperature region is used as a warm-up catalytic converter. Accordingly, when the temperature of the three-way catalyst is low, a method of rapidly increasing the temperature of the exhaust gas or reducing the amount of the exhaust gas in the exhaust gas during the warm-up of the three-way catalyst depending on the presence or absence of the NOx purification function of the three-way catalyst.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and method of controlling engine provided with dual continuously variable valve duration device configured for reducing emissions (EM) contained in the exhaust gas by changing control method depending on the presence or absence of a three-way catalyst (TWC) which has enhanced low temperature nitrogen oxide (NOx) purification function of a warm-up catalytic converter (WCC).

A system of controlling an engine provided with a dual continuously variable valve duration device according to an exemplary embodiment of the present invention may include the engine including a combustion chamber, an intake valve provided in the combustion chamber for selectively supplying air or a mixture of air and fuel to the combustion chamber, an ignition switch provided in the combustion chamber to ignite a burner to burn the mixture, and an exhaust valve disposed in the combustion chamber to selectively discharge an exhaust gas in the combustion chamber to an outside of the combustion chamber, the CVVD provided to adjust an intake duration of the intake valve and an exhaust duration of the exhaust valve, a warm-up catalytic converter (WCC) including a three-way catalyst (TWC) for purifying hydrocarbons, carbon monoxide, nitrogen oxides contained in the exhaust gas downstream of the engine, a Hydrocarbon (HC) trap disposed downstream of the warm-up catalytic converter for adsorbing and removing the hydrocarbons contained in the exhaust gas, an electrically heated catalyst disposed downstream of the HC trap and provided with a heating device, a three-way catalyst (TWC) disposed downstream of the electrically heated catalyst for purifying hydrocarbons, carbon monoxide, and nitrogen oxides contained in the exhaust gas, and a controller for adjusting an ignition timing of the ignition switch, the intake duration and the exhaust duration based on a driving condition of the vehicle, and the controller sets an ignition timing to an optimum ignition timing according to a temperature of a target exhaust gas, sets the intake duration to an intake duration within a predetermined intake duration range, and sets the exhaust duration to an optimum exhaust duration such that a sum of emission amounts of nitrogen oxides (NOx) and hydrocarbons (HC) according to the set intake duration is minimized when the temperature of the exhaust gas after the engine is started reaches a catalyst activation temperature or reaches a set time at which the amount of hydrocarbon (HC) which may be stored in the HC trap is discharged.

The controller, until the temperature of the exhaust gas after the engine starts is less than the catalyst activation temperature and the amount of hydrocarbon (HC) which may be stored in the HC trap reaches the set time for discharging, may set the exhaust duration to an optimum exhaust duration such that a sum of emission amounts of nitrogen oxides (NOx) and hydrocarbons (HC) according to the set intake duration is minimized.

The controller, until the temperature of the exhaust gas after the engine starts is less than the catalyst activation temperature and the amount of hydrocarbon (HC) which may be stored in the HC trap reaches the set time for discharging, may set the exhaust duration to an optimum exhaust duration such that the emission amount of hydrocarbons (HC) according to the set intake duration is minimized.

The controller, until the temperature of the exhaust gas after the engine starts is less than the catalyst activation temperature and the amount of hydrocarbon (HC) which may be stored in the HC trap reaches the set time for discharging, may set the exhaust duration to an optimum exhaust duration such that the emission amounts of nitrogen oxide (NOx) according to the set intake duration is minimized.

The controller, when the temperature of the exhaust gas after the engine starts is equal to or greater than the catalyst activation temperature or the amount of hydrocarbon (HC) which may be stored in the HC trap reaches the set time for discharging, and when the gear-shifting is detected as the D range or the R range or the accelerator pedal is depressed, may set the exhaust duration to an optimum exhaust duration such that a sum of emission amounts of nitrogen oxides (NOx) and hydrocarbons (HC) according to the set intake duration is minimized.

In the system of controlling an engine according to exemplary embodiments of the present invention, the controller, when the gear-shifting is not detected as the D range or the R range and the accelerator pedal is not depressed, may determine whether the temperature of the exhaust gas is equal to or greater than a second set temperature, and when the temperature of the exhaust gas is equal to or greater than the second set temperature, may set the ignition timing to an optimum ignition timing for exhaust gas reduction, set the intake duration to an intake duration within a predetermined intake duration range, and increase the exhaust duration to an optimum exhaust duration for the target exhaust gas reduction and the optimum exhaust duration according to the set intake duration.

Meanwhile, in a method of controlling an engine provided with a dual continuously variable valve duration device according to an exemplary embodiment of the present invention, the engine may include an intake valve, an ignition switch, and an exhaust valve, and the dual continuously variable valve duration device is provided to adjust an intake duration of the intake valve and an exhaust duration of the exhaust valve, and the method of controlling the engine may include setting an ignition timing to an optimum ignition timing according to a temperature of a target exhaust gas when the engine is started, setting the intake duration to an intake duration within a predetermined intake duration range, setting the exhaust duration to an optimum exhaust duration such that a sum of emission amounts of nitrogen oxides (NOx) and hydrocarbons (HC) according to the set intake duration is minimized, determining whether the temperature of the target exhaust gas reaches a first set temperature or reaches a set time at which the amount of hydrocarbon (HC) which may be stored in the HC trap is discharged, and setting the exhaust duration to an optimum exhaust duration such that a sum of emission amounts of nitrogen oxides (NOx) and hydrocarbons (HC) according to the set intake duration is minimized when the temperature of the target exhaust gas reaches the first set temperature or reaches the set time at which the amount of hydrocarbon (HC) which may be stored in the HC trap is discharged.

Meanwhile, in a method of controlling an engine provided with a dual continuously variable valve duration device according to various exemplary embodiments of the present invention, the engine may include an intake valve, an ignition switch, and an exhaust valve, and the dual continuously variable valve duration device is provided to adjust an intake duration of the intake valve and an exhaust duration of the exhaust valve, and the method of controlling the engine may include setting an ignition timing to an optimum ignition timing according to a temperature of a target exhaust gas when the engine is started, setting the intake duration to an intake duration within a predetermined intake duration range, setting the exhaust duration to an optimum exhaust duration such that the emission amount of hydrocarbons (HC) according to the set intake duration is minimized, determining whether the temperature of the target exhaust gas reaches a first set temperature or reaches a set time at which the amount of hydrocarbon (HC) which may be stored in the HC trap is discharged, and setting the exhaust duration to an optimum exhaust duration such that a sum of emission amounts of nitrogen oxides (NOx) and hydrocarbons (HC) according to the set intake duration is minimized when the temperature of the target exhaust gas reaches the first set temperature or reaches the set time at which the amount of hydrocarbon (HC) which may be stored in the HC trap is discharged.

Meanwhile, in a method of controlling an engine provided with a dual continuously variable valve duration device according to various exemplary embodiments of the present invention, the engine may include an intake valve, an ignition switch, and an exhaust valve, and the dual continuously variable valve duration device is provided to adjust an intake duration of the intake valve and an exhaust duration of the exhaust valve, and the method of controlling the engine may include setting an ignition timing to an optimum ignition timing according to a temperature of a target exhaust gas when the engine is started, setting the intake duration to an intake duration within a predetermined intake duration range, setting the exhaust duration to an optimum exhaust duration such that the emission amount of nitrogen oxides (NOx) according to the set intake duration is minimized, determining whether the temperature of the target exhaust gas reaches a first set temperature or reaches a set time at which the amount of hydrocarbon (HC) which may be stored in the HC trap is discharged, and setting the exhaust duration to an optimum exhaust duration such that a sum of emission amounts of nitrogen oxides (NOx) and hydrocarbons (HC) according to the set intake duration is minimized when the temperature of the target exhaust gas reaches the first set temperature or reaches the set time at which the amount of hydrocarbon (HC) which may be stored in the HC trap is discharged.

The method of controlling an engine according to exemplary embodiments of the present invention may further include when the temperature of the target exhaust gas reaches the first set temperature or reaches the set time at which the amount of hydrocarbon (HC) which may be stored in the HC trap is discharged, determining whether the gear-shifting is detected as the D range or the R range or the accelerator pedal is depressed, and when the gear-shifting is detected as the D range or the R range and the accelerator pedal is depressed, setting the exhaust duration to an optimum exhaust duration such that a sum of emission amounts of nitrogen oxides (NOx) and hydrocarbons (HC) according to the set intake duration is minimized.

The method of controlling an engine according to exemplary embodiments of the present invention may further include when the gear-shifting is not detected as the D range or the R range and the accelerator pedal is not depressed, determining whether the temperature of the exhaust gas is equal to or greater than a second set temperature, when the temperature of the exhaust gas is equal to or greater than the second set temperature, setting the ignition timing to an optimum ignition timing for exhaust gas reduction, setting the intake duration to an intake duration within a predetermined intake duration range, and increasing the exhaust duration to an optimum exhaust duration for the target exhaust gas reduction and the optimum exhaust duration according to the set intake duration.

According to exemplary embodiments of the present invention, by controlling the intake duration, exhaust duration and ignition timing of the engine, the amount of emissions contained in the exhaust gas may be reduced. By reducing the amount of emissions entering the three-way catalyst while the three-way catalyst is not warmed up, the amount of emissions exiting the vehicle may be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
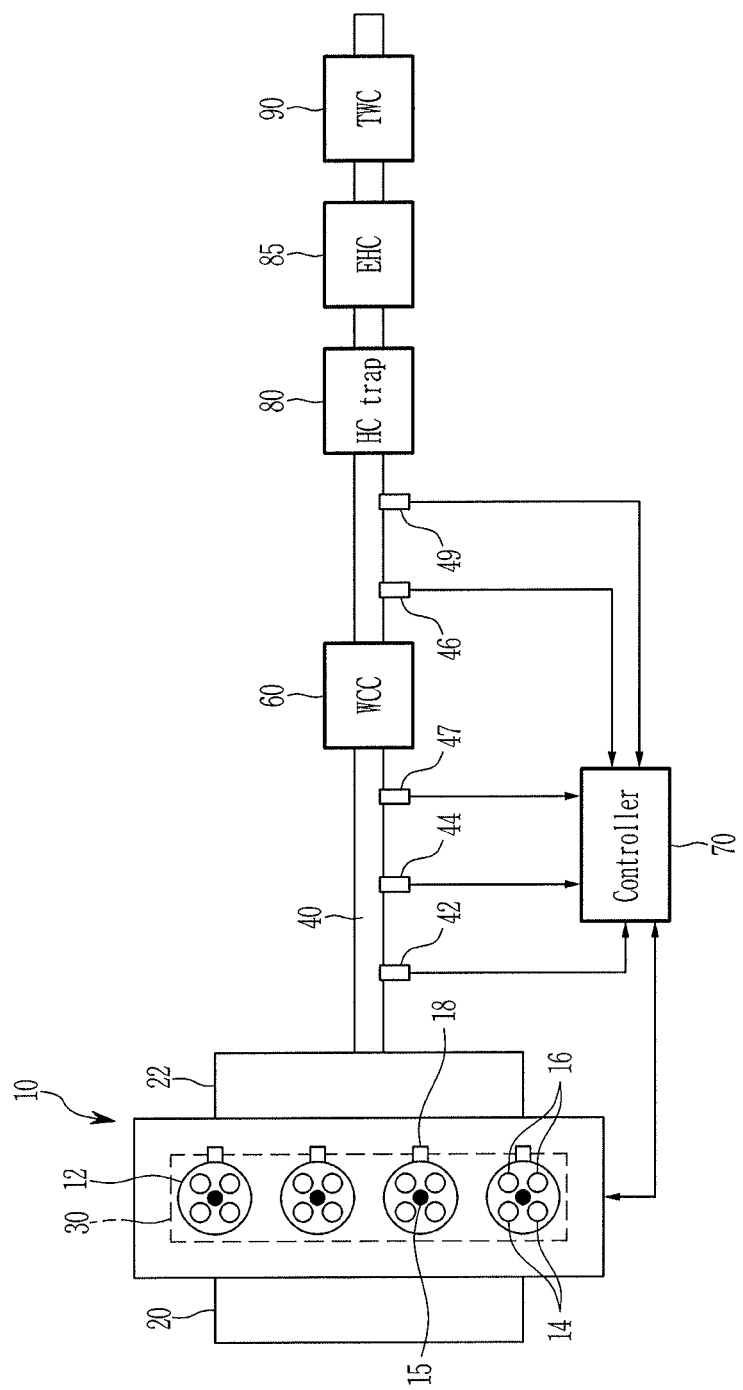
FIG. 1 is a schematic diagram of a system of controlling an engine according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

The terminology used herein is for the purpose of describing various exemplary embodiments only and is not intended to be limiting of the present invention. As used herein, the singular forms "a," "an," and "the" are intended to include the plural forms as well, unless the context clearly indicates otherwise. It will be further understood that the terms "comprises" and/or "comprising," when used in the exemplary embodiment, specify the presence of stated features, integers, steps, operations, elements, and/or components, but do not preclude the presence or addition of one or more other features, integers, steps, operations, elements, components, and/or groups thereof. As used herein, the term "and/or" may include any and all combinations of one or more of the associated listed items. The term "coupled" denotes a physical relationship between two components whereby the components are either directly connected to one another or indirectly connected via or more intermediary components.

It is understood that the term "vehicle," "vehicular," "car," or other similar term as used herein is inclusive of motor vehicles, in general, such as passenger vehicles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum).

Additionally, it is understood that one or more of the below methods, or aspects thereof, may be executed by at least one controller. The term "controller" may refer to a hardware device that includes a memory and a processor. The memory is configured to store program instructions, and the processor is programmed to execute the program instructions to perform one or more processes which are described further below. Moreover, it is understood that the below methods may be executed by a system including the controller, as described in detail below.

Furthermore, the controller of the present invention may be embodied as non-transitory computer readable media including executable program instructions executed by a processor or the like. Examples of the computer readable mediums include, but are not limited to, ROM, RAM, compact disc (CD)-ROMs, magnetic tapes, floppy disks, flash drives, smart cards, and optical data storage devices. The computer readable recording medium can also be distributed throughout a computer network so that the program instructions are stored and executed in a distributed fashion, e.g., by a telematics server or a Controller Area Network (CAN).

Hereinafter, various exemplary embodiments of the present invention will be described in detail with reference to the accompanying drawings.

FIG. 1 is a schematic diagram of a system of controlling an engine according to an exemplary embodiment of the present invention.

As shown in FIG. 1, a system of controlling an engine according to an exemplary embodiment of the present invention includes an engine 10, a dual continuously variable valve duration (CVVD) apparatus 30, a warm-up catalytic converter (WCC) 60, an exhaust pipe 40, a hydrocarbon trap (HC trap) 80, an electrically heated catalyst 85, a three-way catalyst 90, and a controller 70.

The engine 10 burns air-fuel mixture in which fuel and air are mixed to convert chemical energy into mechanical energy. The engine 10 includes a combustion chamber 12, an intake valve 14, an ignition plug 15, an exhaust valve 16, an injector 18, an intake manifold 20, and an exhaust manifold 22.

The combustion chamber 12 is connected to the intake manifold 20 to receive an air or the air-fuel mixture therein. An intake port is formed at the combustion chamber 12 and is provided with the intake valve 14. The intake valve 14 is operated by a rotation of a camshaft connected to a crankshaft to open or close the intake port. When the intake valve 14 opens the intake port, the air or the air-fuel mixture in the intake manifold 20 flows into the combustion chamber 12 through the intake port. When the intake valve 14 closes the intake port, On the other hand, the air or the air-fuel mixture in the intake manifold 20 does not flow into the combustion chamber 12. Furthermore, the combustion chamber 12 is connected to the exhaust manifold 22 so that the exhaust gas generated in the combustion process is collected in the exhaust manifold 22 and flows out to the exhaust pipe 40. An exhaust port is formed at the combustion chamber 12 and is provided with the exhaust valve 16. The exhaust valve 16 is also operated by the rotation of the camshaft connected to the crankshaft to open or close the exhaust port. When the exhaust valve 16 opens the exhaust port, the exhaust gas in the combustion chamber 12 flows to the exhaust manifold 22 through the exhaust port. When the exhaust valve 16 closes the exhaust port, On the other hand, the exhaust gas in the combustion chamber 12 does not flow to the exhaust manifold 22.

Depending on types of the engine, the combustion chamber 12 may be provided with the injector 18 to inject the fuel into the combustion chamber 12 (e.g., in case of a gasoline direct injection engine). Furthermore, depending on the types of the engine, the ignition switch 15 may be provided at a top of the combustion chamber 12 to ignite the air-fuel mixture in the combustion chamber 12 (e.g., in case of a gasoline engine).

The dual CVVD apparatus 30 is mounted at an upper portion of the engine 10 and adjusts a duration of the intake valve 14 and a duration of the exhaust valve 16. The dual CVVD apparatus 30 is constructed by incorporating an intake CVVD apparatus configured for variably controlling the duration of the intake valve 14 and an exhaust CVVD apparatus configured for variably controlling the uration of the exhaust valve 16. Various CVVD apparatus known so far, such as a continuous variable valve duration (CVVD) apparatus disclosed in Korean Patent No. 1619394, may be used as the dual CVVD apparatus 30, and the entire contents of Korean Patent No. 1619394 are incorporated herein by reference. Also, in addition to the CVVD apparatus disclosed in Korean Patent No. 1619394, various CVVD apparatuses known so far may be used, and it is to be understood that the CVVD apparatus according to the exemplary embodiments of the present invention is not limited to the CVVD apparatus disclosed in Korean Patent No. 1619394.

Here, the duration of the intake valve 14 is referred to as an 'intake duration'. The intake duration is defined as a duration from when the intake valve 14 is open to when the intake valve 14 is closed. Furthermore, a timing at which the intake valve 14 is open is referred to as an intake valve open (IVO) timing, and a timing at which the intake valve 14 is closed is referred to as an intake valve close (IVC) timing. Therefore, the intake duration is the duration from the IVO timing to the IVC timing.

Here, the duration of the exhaust valve 16 is referred to as an 'exhaust duration'. The exhaust duration is defined as a duration from when the exhaust valve 16 is open to when the exhaust valve 16 is closed. Furthermore, a timing at which the exhaust valve 16 is open is referred to as an exhaust valve open (EVO) timing, and a timing at which the exhaust valve 16 is closed is referred to as an exhaust valve close (EVC) timing. Therefore, the exhaust duration is the duration from the EVO timing to the EVC timing.

The exhaust pipe 40 is connected to the exhaust manifold 22 to discharge the exhaust gas to an outside of a vehicle. Various catalytic converters are mounted on the exhaust pipe 40 to remove emission (EM) contained in the exhaust gas. For convenience of explanation, it is exemplified that the warm-up catalytic converter 60 including the TWC is mounted on the exhaust pipe 40, but it is to be understood that the catalytic converter mounted on the exhaust pipe 40 is not limited to the warm-up catalytic converter 60 including the TWC.

The warm-up catalytic converter 60 including the three-way catalyst is disposed on the exhaust pipe 40 through which the exhaust gas discharged from the engine 10 flows, and harmful materials including CO, HC, and NOx contained in the exhaust gas are converted into harmless components by an oxidation-reaction reaction in the TWC. Since the three-way converter is well-known to a person of an ordinary skill in the art, a detailed description thereof will be omitted.

The HC trap 80 is disposed downstream of the warm-up catalytic converter 60 for adsorbing and removing the hydrocarbons contained in the exhaust gas. The electrically heated catalyst 85 is disposed downstream of the HC trap 80 and provided with a heating device. The electrically heated catalyst 85 reduces the catalyst activation time of the vehicle so that the time for the catalyst to start reducing the exhaust gas is increased. In the case of gasoline engines, this reduces particulate emissions of hydrocarbons (HC) during cold start, and reduces emissions of carbon monoxide (CO) and nitrogen oxides (NOx) in the case of diesel engines. When the catalytically coated structure is quickly heated, the catalyst temperature rises to the operating temperature as soon as the driver depresses the accelerator pedal.

Furthermore, a three-way catalyst 90 may be additionally disposed downstream of the electrically heated catalyst 85 for purifying hydrocarbons, carbon monoxide, and nitrogen oxides contained in the exhaust gas.

The exhaust pipe 40 is provided with a plurality of sensors 42, 44, 46, 47, and 49 for detecting a combustion state and a function of the warm-up catalytic converter 60.

The temperature sensor 42 is mounted on the exhaust pipe 40 at an upstream of the warm-up catalytic converter 60, detects a temperature of the exhaust gas at the upstream of the warm-up catalytic converter 60, and transmits a signal corresponding thereto to the controller 70.

The first oxygen sensor 44 is mounted on the exhaust pipe 40 at the upstream of the warm-up catalytic converter 60, detects $O_2$ concentration in the exhaust gas at the upstream of the warm-up catalytic converter 60, and transmits a signal corresponding thereto to the controller 70.

The second oxygen sensor 46 is mounted on the exhaust pipe 40 at the downstream of the warm-up catalytic converter 60, detects $O_2$ concentration in the exhaust gas at the downstream of the warm-up catalytic converter 60, and transmits a signal corresponding thereto to the controller 70.

The first NOx sensor 47 is mounted on the exhaust pipe 40 at the upstream of the warm-up catalytic converter 60, detects NOx concentration in the exhaust gas at the upstream of the warm-up catalytic converter 60, and transmits a signal corresponding thereto to the controller 70.

The second NOx sensor 49 is mounted on the exhaust pipe 40 at the downstream of the warm-up catalytic converter 60, detects NOx concentration in the exhaust gas at the downstream of the warm-up catalytic converter 60, and transmits a signal corresponding thereto to the controller 70.

Figure 2:
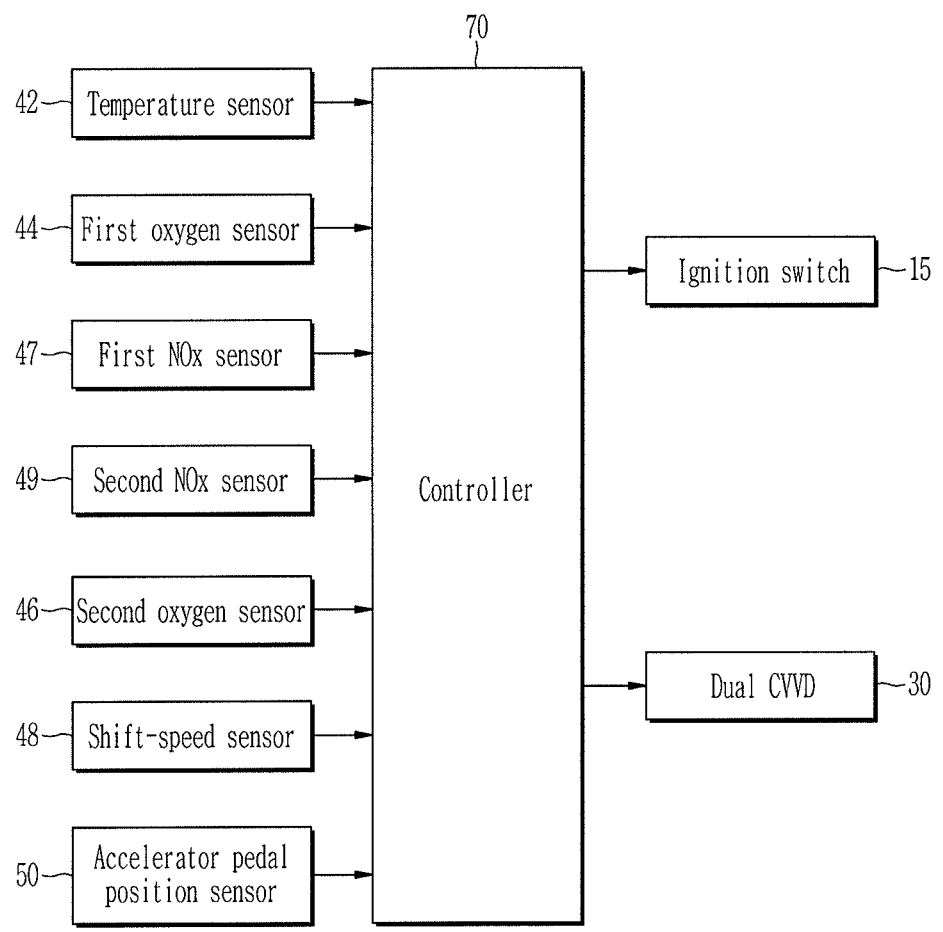
FIG. 2 is a block diagram of a system of controlling an engine according to an exemplary embodiment of the present invention.

In addition to the sensors 42, 44, 46, 47, and 49 described herein, a system for controlling the engine may further include various sensors. For example, an additional temperature sensor may be mounted on the exhaust pipe 40 at the downstream of the warm-up catalytic converter 60 to detect the temperature of the exhaust gas at the downstream of the warm-up catalytic converter 60. Furthermore, as shown in FIG. 2, the system of controlling the engine may further include a shift-speed sensor 48 and an accelerator pedal position sensor 50. Furthermore, the system of controlling the engine may further include an HC sensor or a CO2 sensor mounted on the exhaust pipe 40, and concentration of the EM contained in the exhaust gas may be detected via these sensors.

The controller 70 is electrically connected to the sensors 42, 44, 46, 47, 48, 49, and 50 to receive the signals corresponding to the detected values by the sensors 42, 44, 46, 47, 48, 49, and 50, and determines the combustion state, whether the warm-up catalytic converter 60 normally operates, and/or a driving condition of the vehicle based on the signals. The controller 70 controls at least one of an ignition timing of the ignition plug 15, the intake duration, and the exhaust duration based on the determination results. The controller 70 may be implemented with one or more processors executed by a predetermined program and the predetermined program may be programmed to perform each step of a method of controlling the engine according to the exemplary embodiments of the present invention.

Hereinafter, with reference to FIG. 2, inputs and outputs of the controller 70 in the system of controlling the engine according to the exemplary embodiments of the present invention will be described in more detail.

FIG. 2 is a block diagram of a system of controlling an engine according to an exemplary embodiment of the present invention.

FIG. 2 is a simplified illustration of the inputs and the outputs of the controller 70 for implementing the system of the system of controlling the engine according to the exemplary embodiments of the present invention, and it is to be understood that the inputs and the outputs of the controller 70 is not limited to the exemplary embodiment illustrated in FIG. 2.

As shown in FIG. 2, the controller 70 is electrically connected to the temperature sensor 42, the first and second oxygen sensors 44 and 46, the first and second NOx sensors 47 and 49, the shift-speed sensor 48, and the accelerator pedal position sensor 50, and receives the signals corresponding to the detected values by the sensors 42, 44, 46, 47, 48, 49, and 50.

The temperature sensor 42 detects the temperature of the exhaust gas at the upstream of the warm-up catalytic converter 60 and transmits the signal corresponding thereto to the controller 70. The controller 70 predicts a bed temperature of the warm-up catalytic converter 60 based on the signal.

The first oxygen sensor 44 detects $O_2$ concentration in the exhaust gas at the upstream of the warm-up catalytic converter 60, and transmits a signal corresponding thereto to the controller 70, and the second oxygen sensor 46 detects $O_2$ concentration in the exhaust gas at the downstream of the warm-up catalytic converter 60, and transmits a signal corresponding thereto to the controller 70. The controller 70 determines whether or not the warm-up catalytic converter 60 is normally operating based on the signals of the first and second oxygen sensors 44 and 46 and controls the air-fuel ratio control of the engine 10.

The first NOx sensor 47 detects NOx concentration in the exhaust gas at the upstream of the warm-up catalytic converter 60, and transmits a signal corresponding thereto to the controller 70, and the second NOx sensor 49 detects NOx concentration in the exhaust gas at the downstream of the warm-up catalytic converter 60, and transmits a signal corresponding thereto to the controller 70. The controller 70 may determine whether or not the NOx purification performance of the warm-up catalytic converter 60 is activated below activation temperature of the exhaust gas based on the signals of the first and second NOx sensors 47 and 49.

The shift-speed sensor 48 detects the shift range in which the shift lever is located and transmits a signal to the controller 70. For example, the shift range may include a P range, an R range, an N range, a D range, and the like.

The accelerator pedal position sensor 50 detects a displacement of an accelerator pedal and transmits a signal corresponding thereto to the controller 70. For example, if a driver does not depress the accelerator pedal at all, the displacement of the accelerator pedal may be 0%, and if the driver fully depresses the accelerator pedal, the displacement of the accelerator pedal may be 100%. The displacement of the accelerator pedal indicates the driver's will to accelerate.

The controller 70 controls operation of at least one of the ignition plug 15 and the dual CVVD 30 based on the detected values by the sensors 42, 44, 46, 47, 48, 49, and 50. That is, the controller 70 controls the ignition timing of the ignition plug 15, the intake duration, and/or the exhaust duration.

Here, the influence of the ignition timing, the intake duration and the exhaust duration on the exhaust gas temperature will be described with reference to FIG. 3, FIG. 4, and FIG. 5 and FIG. 9.

Figure 3:
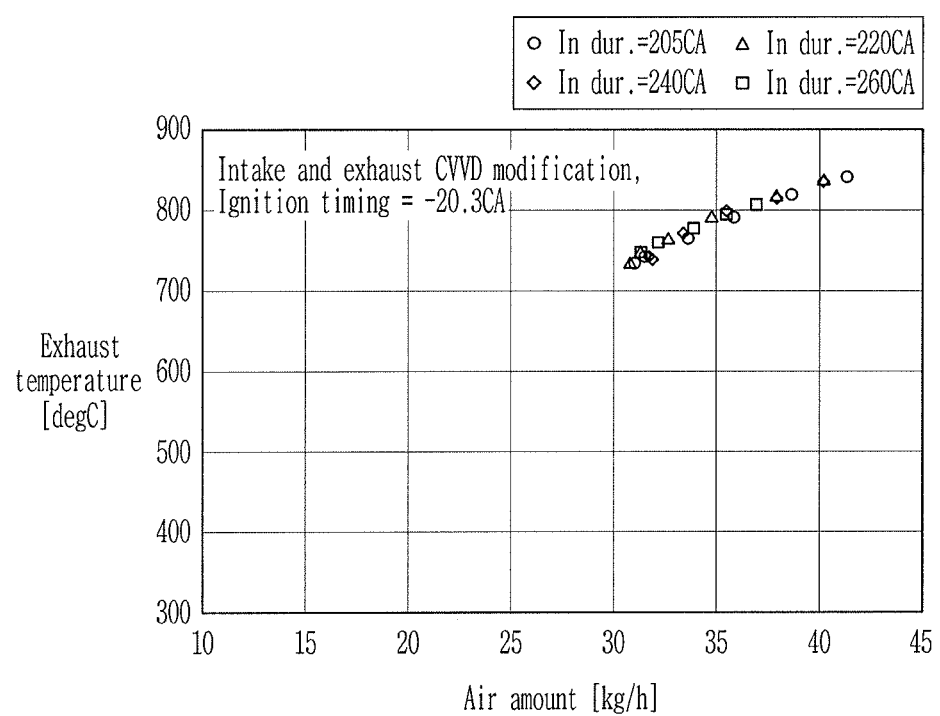
FIG. 3 is a graph showing the temperature of the exhaust gas when the intake duration is fixed and the exhaust duration is varied while the ignition timing is fixed to −20.3 CA.
Figure 4:
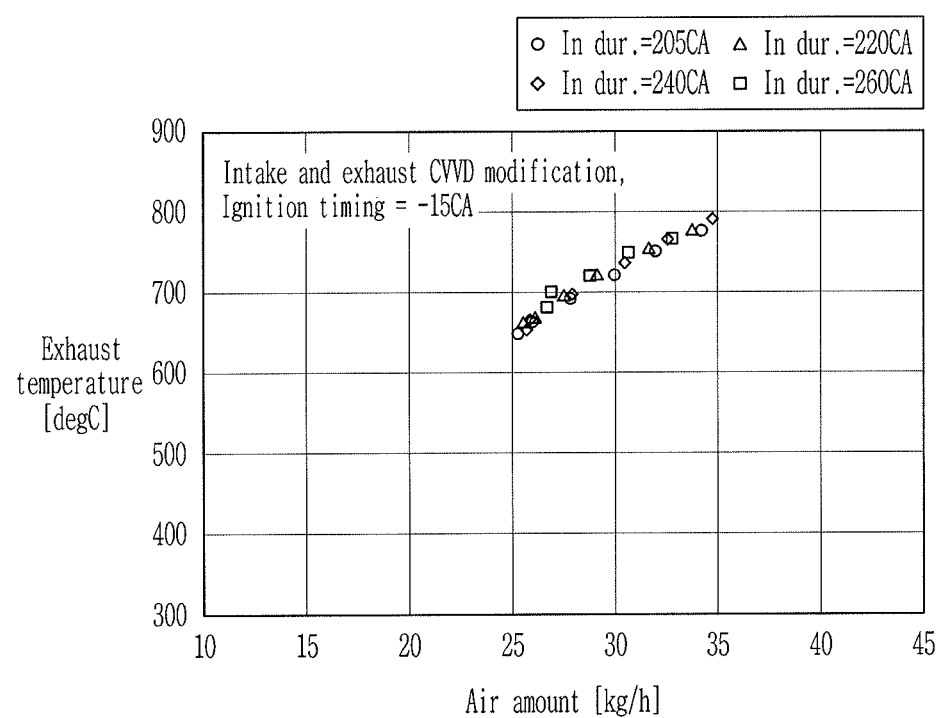
FIG. 4 is a graph showing the temperature of the exhaust gas when the intake duration is fixed and the exhaust duration is varied while the ignition timing is fixed to −15 CA.
Figure 5:
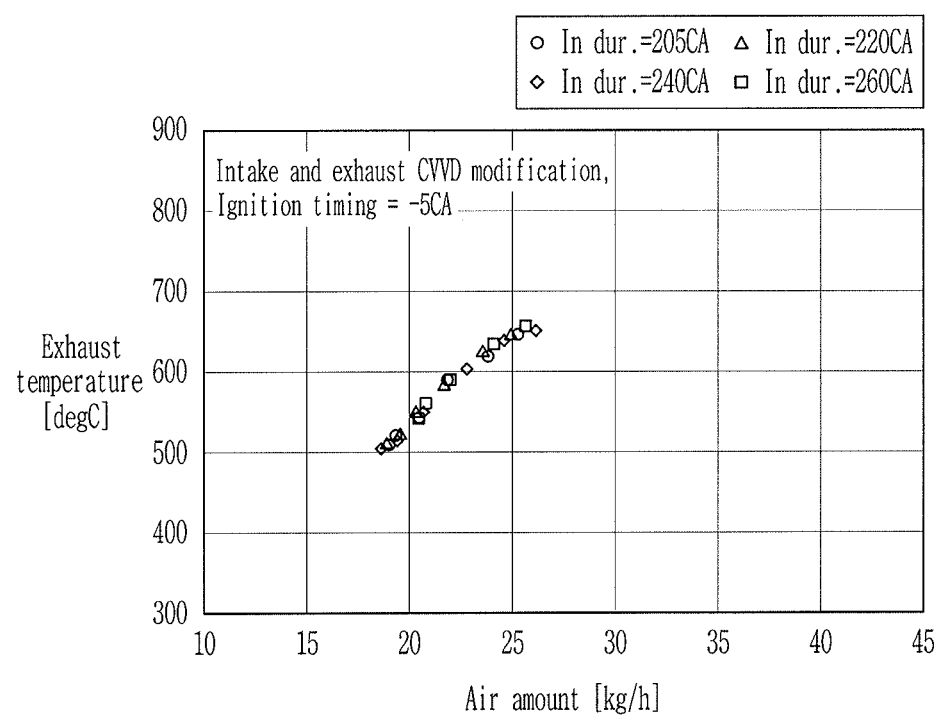
FIG. 5 is a graph showing the temperature of the exhaust gas when the intake duration is fixed and the exhaust duration is varied while the ignition timing is fixed to −5 CA.
Figure 9:
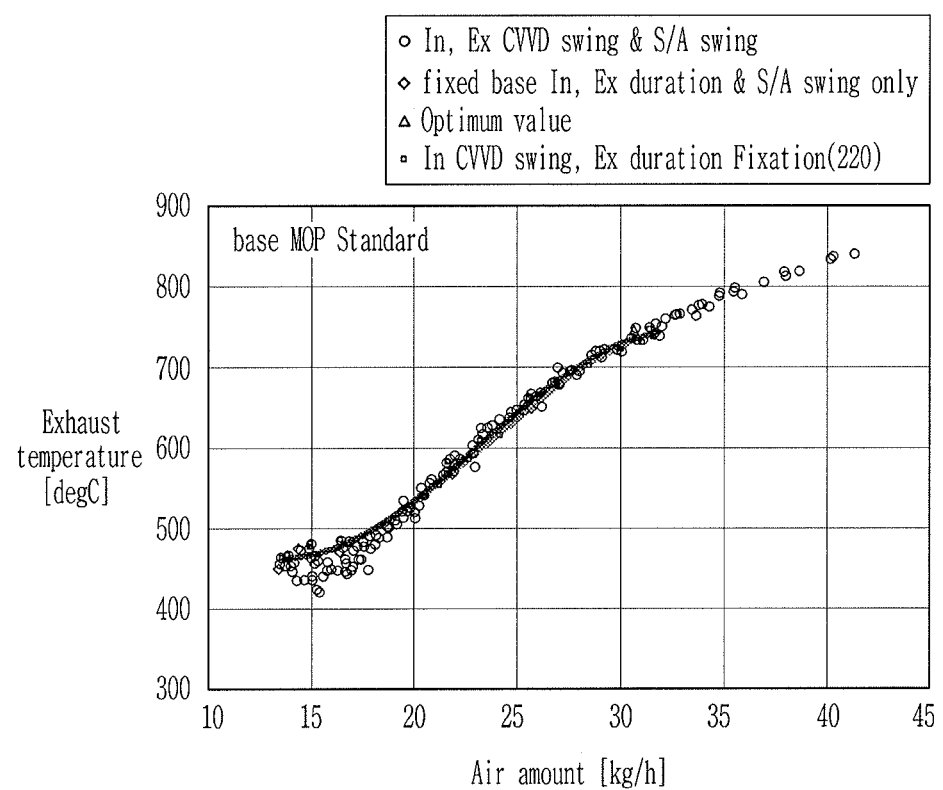
FIG. 9 is a graph showing the temperature of the exhaust gas when the intake duration is varied and when the exhaust duration is varied while the ignition timing is fixed.

FIG. 3 is a graph showing the temperature of the exhaust gas when the intake duration is fixed and the exhaust duration is varied while the ignition timing is fixed to −20.3 CA, FIG. 4 is a graph showing the temperature of the exhaust gas when the intake duration is fixed and the exhaust duration is varied while the ignition timing is fixed to −15 CA, and FIG. 5 is a graph showing the temperature of the exhaust gas when the intake duration is fixed and the exhaust duration is varied while the ignition timing is fixed to −5 CA. Furthermore, FIG. 9 is a graph showing the temperature of the exhaust gas when the intake duration is varied and when the exhaust duration is varied while the ignition timing is fixed. In FIG. 3 to FIG. 5, the air amount is associated with the exhaust duration. That is, when the exhaust duration increases, the air amount also increases. Therefore, the air amount may be understood as the exhaust duration. Here, '−' sign means prior to 'top dead center (TDC)'. Also, in the ignition timing, '−' means retardation and '+' means advance angle.

As shown in FIG. 3, with the ignition timing fixed at −20.3 CA (crank angle), it may be seen that the temperature of the exhaust gas rises as the exhaust duration increases, regardless of the intake duration. Similarly, as shown in FIG. 4 and FIG. 5, it may be seen that even when the ignition timing is fixed at −15 CA or −5 CA, the temperature of the exhaust gas rises as the exhaust duration increases, regardless of the intake duration. However, the temperature range of the exhaust gas varies depending on the ignition timing. For example, if the ignition timing is −20.3 CA, the temperature range of the exhaust gas is about 720° C. to 850° C. If the ignition timing is −15 CA, the temperature range of the exhaust gas is about 650° C. to 800° C., and if the ignition timing is −5 CA, the temperature range of the exhaust gas is about 500° C. to 650° C. Furthermore, the variable range of the exhaust duration is determined in accordance with the intake duration. For example, if the intake duration is 205 CA or 220 CA, the exhaust duration may be increased to 315 CA, but if the intake duration is 240 CA or 260 CA, increasing the exhaust duration to 315 CA results in poor combustion stability. Therefore, the range in which the exhaust duration may be increased according to the intake duration is determined. Here, the maximum value of the exhaust duration according to the intake duration is defined as the limit exhaust duration.

On the other hand, it was found in the experiment that the influence of the intake duration on the exhaust gas temperature is small when the intake duration is varied while the ignition timing and the exhaust duration are fixed. These experimental results are shown collectively in FIG. 9.

As shown in FIG. 9, when the exhaust duration is fixed and only the intake duration is varied, the temperature of the exhaust gas does not rise much higher than the exhaust gas temperature when the intake duration and the exhaust duration are fixed. On the other hand, if the intake duration is fixed and only the exhaust duration is varied, the temperature of the exhaust gas may be increased by about 100° C. more than the exhaust gas temperature when the intake duration and the exhaust duration are fixed. Therefore, it is efficient to increase the exhaust gas temperature by fixing the intake duration and increasing the exhaust duration to the limit duration. Furthermore, from the viewpoint of temperature of the exhaust gas, it is efficient to retard the ignition timing as much as possible. However, the ignition timing may be set to a value within a predetermined ignition timing range in consideration of the combustion stability and the driving condition of the vehicle, and the intake duration may be set to a value within a predetermined intake duration range. For example, but not limited to, a predetermined ignition timing range for the exhaust gas temperature rise may be −20.3 CA to −15 CA, and a predetermined intake duration range may be 205 CA to 260 CA.

Hereinafter, the influence of the ignition timing, the intake duration and the exhaust duration on the amounts of nitrogen oxides and hydrocarbons will be described below with reference to FIG. 6, FIG. 7, and FIG. 8 and FIG. 10.

Figure 6:
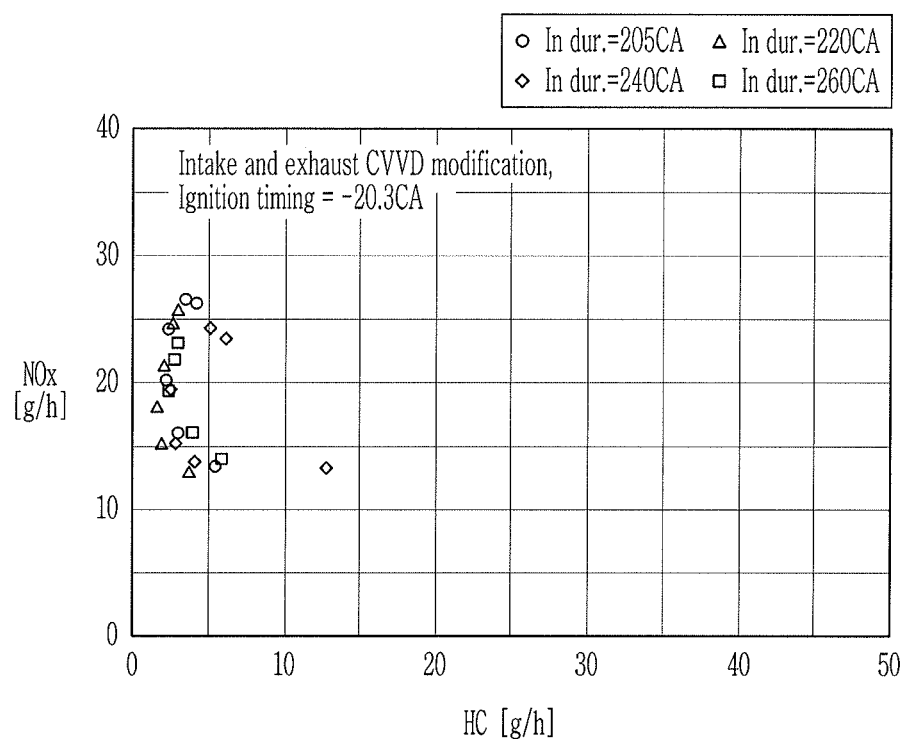
FIG. 6 is a graph showing an amount of nitrogen oxides and hydrocarbons when the intake duration is fixed and the exhaust duration is varied while the ignition timing is fixed to −20.3 CA.
Figure 7:
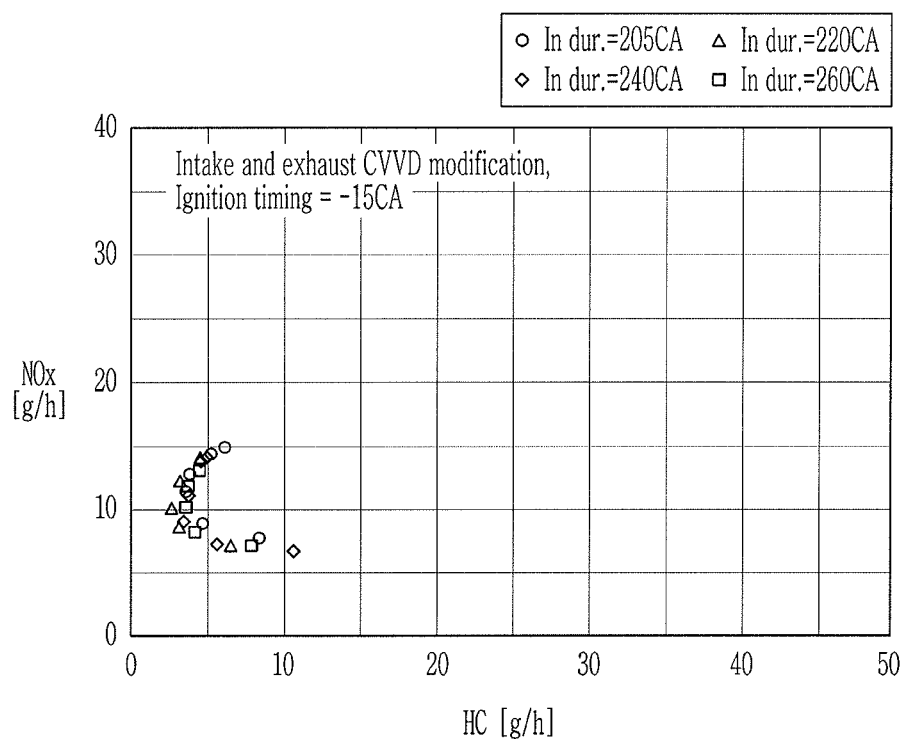
FIG. 7 is a graph showing an amount of nitrogen oxides and hydrocarbons when the intake duration is fixed and the exhaust duration is varied while the ignition timing is fixed to −15 CA.
Figure 8:
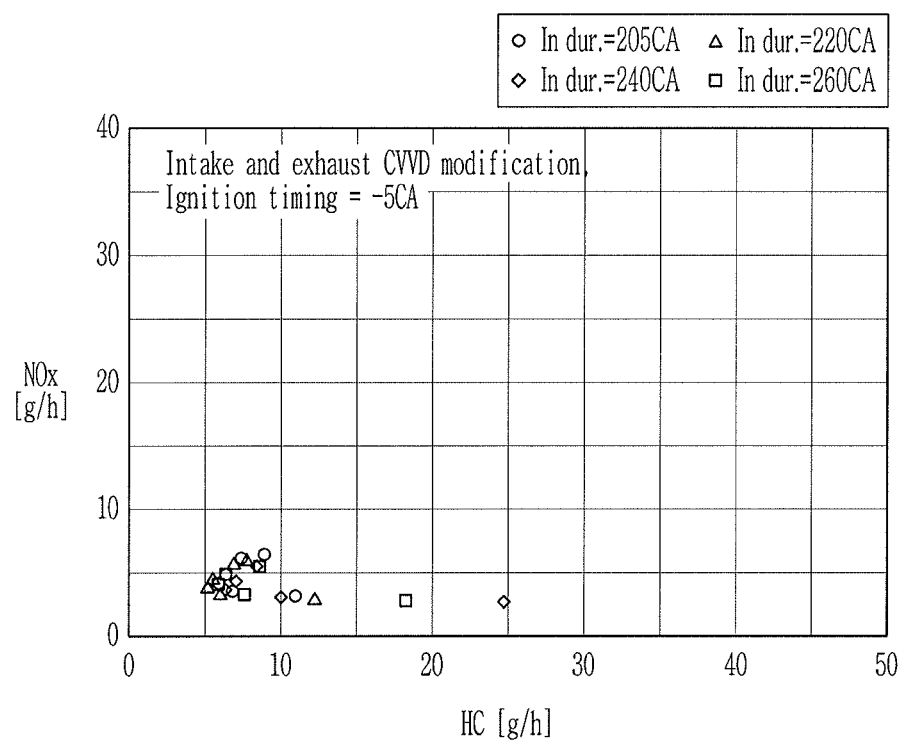
FIG. 8 is a graph showing an amount of nitrogen oxides and hydrocarbons when the intake duration is fixed and the exhaust duration is varied while the ignition timing is fixed to −5 CA.
Figure 10:
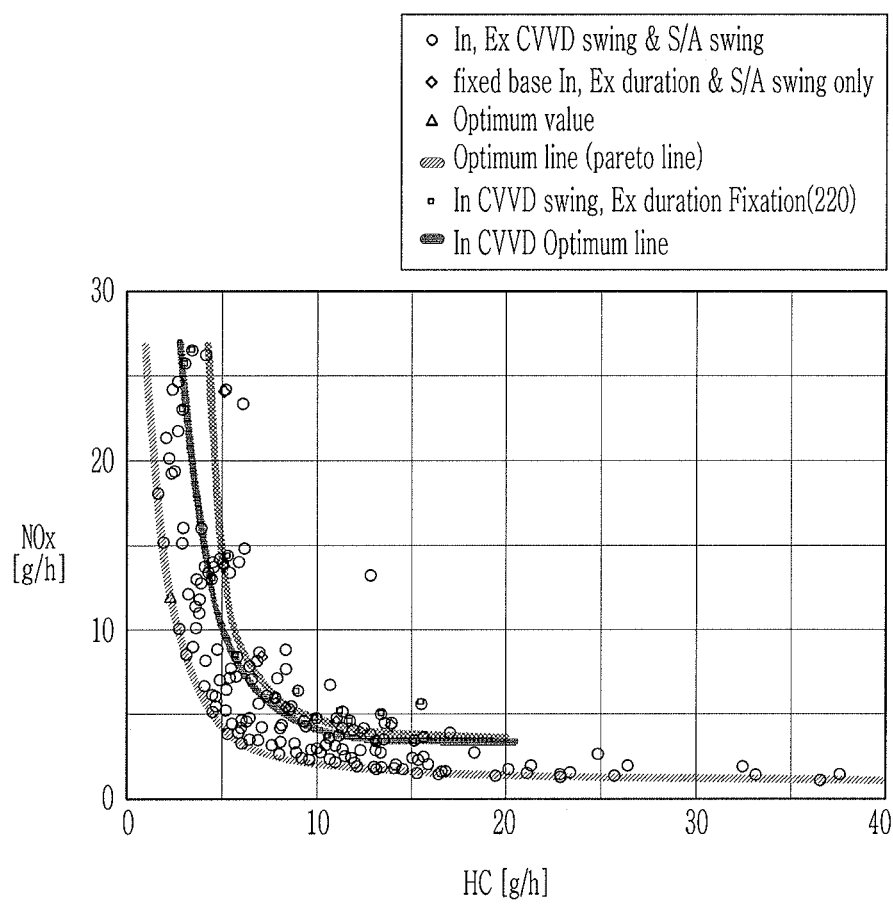
FIG. 10 is a graph showing an amount of nitrogen oxides and hydrocarbons when the intake duration is varied and when the exhaust duration is varied while the ignition timing is fixed.

FIG. 6 is a graph showing an amount of nitrogen oxides and hydrocarbons when the intake duration is fixed and the exhaust duration is varied while the ignition timing is fixed to −20.3 CA, FIG. 7 is a graph showing an amount of nitrogen oxides and hydrocarbons when the intake duration is fixed and the exhaust duration is varied while the ignition timing is fixed to −15 CA, and FIG. 8 is a graph showing an amount of nitrogen oxides and hydrocarbons when the intake duration is fixed and the exhaust duration is varied while the ignition timing is fixed to −5 CA. Furthermore, FIG. 10 is a graph showing an amount of nitrogen oxides and hydrocarbons when the intake duration is varied and when the exhaust duration is varied while the ignition timing is fixed.

As shown in FIG. 6, it may be seen that the amount of nitrogen oxides and the amount of hydrocarbons vary with the variation of the exhaust duration, with the ignition timing fixed at −20.3 CA. It can also be seen that as the exhaust duration changes, the change in the amount of nitrogen oxides is greater than the change in the amount of hydrocarbons.

As shown in FIG. 7, it may be seen that the amount of nitrogen oxides and the amount of hydrocarbons vary with the variation of the exhaust duration under the condition that the ignition timing is fixed at −15 CA. It can also be seen that the change in the amount of nitrogen oxides and the change in the amount of hydrocarbons are similar as the exhaust duration changes. However, as the exhaust duration changes, the change in the amount of nitrogen oxides when the ignition timing is −15 CA is smaller than the change in the amount of nitrogen oxides when the ignition timing is −20.3 CA, but when the ignition timing is −15 CA, it may be seen that the change is greater than the change in the amount of hydrocarbon when the ignition timing is −20.3 CA.

As shown in FIG. 8, it may be seen that the amount of nitrogen oxides and the amount of hydrocarbons vary with the variation of the exhaust duration under the condition that the ignition timing is fixed at −5 CA. Also, it may be seen that as the exhaust duration changes, the change in the amount of nitrogen oxides is small but the change in the amount of hydrocarbons is large.

Referring to FIG. 6, FIG. 7, and FIG. 8, when the ignition timing is −5 CA, if the intake duration is 205 CA to 220 CA, the exhaust duration is 281 CA, which is the minimum amount of exhaust oxide (sum of the amount of nitrogen oxide and hydrocarbon), and if the intake duration is 240 CA to 260 CA, the minimum exhaust duration is 260 CA. When the ignition timing is −15 CA, if the intake duration is 205 CA to 220 CA, the exhaust duration is 281 CA to 315 CA to minimize the amount of the exhaust, and if the intake duration is 240 CA, And when the intake duration is 260 CA, the exhaust duration at which the amount of the exhaust is minimized is 281 CA. Furthermore, when the ignition timing is −20.3, if the intake duration is 205 CA to 220 CA, the exhaust duration is 281 CA to 315 CA, which is the minimum amount of exhaust oxide, and when the intake duration is 240 CA to 260 CA, the exhaust duration is 281 CA to 300 CA.

On the other hand, in the case where the intake duration is varied in a state where the ignition timing and the exhaust duration are fixed, the influence of the intake duration on the amounts of nitrogen oxides and hydrocarbons varies with the ignition timing and the intake duration, it has been found in experiments that an effect of the exhaust duration on the amount is smaller than that of the exhaust duration. These experimental results are shown collectively in FIG. 10.

As shown in FIG. 10, when the exhaust duration is fixed and only the intake duration is increased, the amount of nitrogen oxides and hydrocarbons (the middle thick curve) is smaller than the amount of nitrogen oxides and hydrocarbons (the right side thick curve) when the exhaust duration and the intake duration are fixed. However, it may be seen that the degree of decrease in the amount of nitrogen oxides and hydrocarbons due to the variation of the intake duration is small. In contrast, when the intake duration is fixed and only the exhaust duration is increased, the amount of nitrogen oxides and hydrocarbons (the left side thick curve) is smaller than the amount of nitrogen oxides and hydrocarbons (the right side thick curve) when the exhaust duration and the intake duration are fixed. Furthermore, it may be seen that the degree of decrease in the amount of nitrogen oxides and hydrocarbons due to the variation of the intake duration is large. On the other hand, as the intake duration is fixed and the exhaust duration is increased, the amount of nitrogen oxides decreases, but the amount of hydrocarbons decreases and then increases again. Therefore, to reduce the amount of nitrogen oxides, it is effective to reduce the retardation of the ignition timing as much as possible, to fix the intake duration, and to increase the exhaust duration. To reduce the amount of hydrocarbons, the exhaust duration should be determined according to the optimum ignition timing and the optimum intake duration in a state where the ignition timing and the intake duration are fixed to the optimum ignition timing and the optimum intake duration, respectively.

Figure 11:
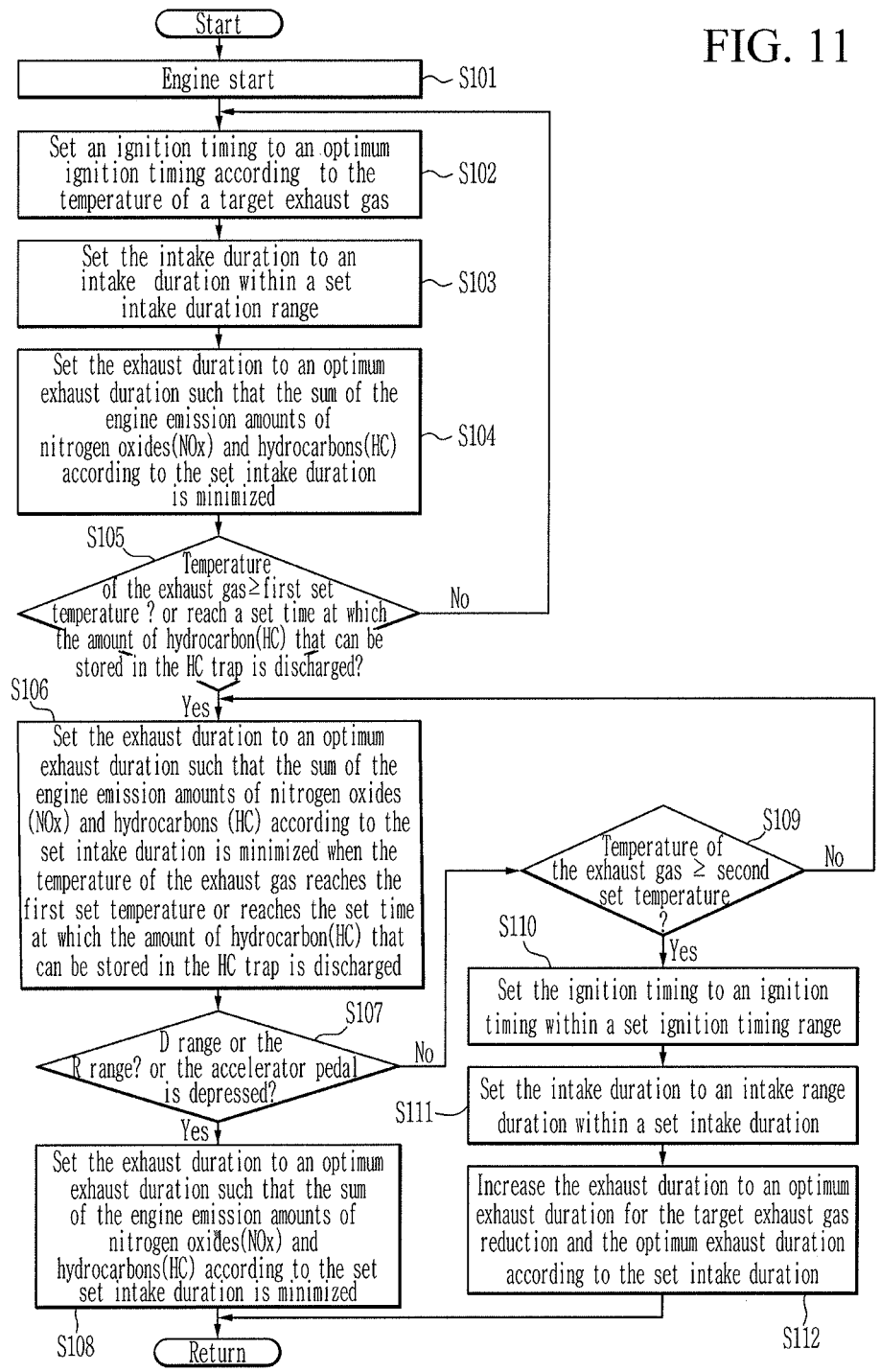
FIG. 11 is a flowchart of a method of controlling an engine according to an exemplary embodiment of the present invention.

Hereinafter, the engine control method according to an exemplary embodiment of the present invention will be described in detail with reference to FIG. 11. FIG. 11 is a flowchart of a method of controlling an engine according to an exemplary embodiment of the present invention. The method of controlling an engine according to an exemplary embodiment of the present invention illustrated in FIG. 11 relates to a method of controlling an engine including a warm-up catalytic converter including a common three-way catalyst.

Referring to FIG. 11, firstly, the engine starts S101.

As such, the controller 70 sets an ignition timing to an optimum ignition timing according to a temperature of a target exhaust gas S102, and sets the intake duration to an intake duration within a predetermined intake duration range S103.

As such, the controller 70 sets the exhaust duration to an optimum exhaust duration such that a sum of emission amounts of nitrogen oxides (NOx) and hydrocarbons (HC) according to the set intake duration is minimized S104.

As such, the controller 70 determines whether the temperature of the target exhaust gas reaches a first set temperature or reaches a set time at which the amount of hydrocarbon (HC) which may be stored in the HC trap is discharged S105. Here, the first set temperature is a catalyst activation temperature, and the catalyst activation temperature refers to the temperature of the exhaust gas corresponding to the temperature at which the three-way catalyst starts to be activated (for example, 200° C.).

As such, the controller 70 sets the exhaust duration to an optimum exhaust duration such that a sum of emission amounts of nitrogen oxides (NOx) and hydrocarbons (HC) according to the set intake duration is minimized when the temperature of the target exhaust gas reaches the first set temperature or reaches the set time at which the amount of hydrocarbon (HC) which may be stored in the HC trap is discharged S106.

If the temperature of the exhaust gas does not reach the first set temperature and does not reach the set time at which the amount of hydrocarbon (HC) which may be stored in the HC trap is discharged, the controller 70 returns to step S102 and sets an ignition timing to an optimum ignition timing according to a temperature of a target exhaust gas S102.

As such, the controller 70 determines whether the D range or the R range is selected or the accelerator pedal is depressed by changing the position of the shift lever S107.

When the temperature of the target exhaust gas reaches a first set temperature or reaches a set time at which the amount of hydrocarbon (HC) which may be stored in the HC trap is discharged, and the gear-shifting is detected as the D range or the R range and the accelerator pedal is depressed, the controller 70 sets the exhaust duration to an optimum exhaust duration such that a sum of emission amounts of nitrogen oxides (NOx) and hydrocarbons (HC) according to the set intake duration is minimized S108.

When the gear-shifting is not detected as the D range or the R range and the accelerator pedal is not depressed, the controller 70 determines whether the temperature of the exhaust gas is equal to or greater than a second set temperature S109. Here, the second set temperature refers to the temperature of the exhaust gas corresponding to the temperature (e.g., 300° C. to 350° C.) at which the three-way catalyst can purify the effluent with high purification efficiency.

When the temperature of the exhaust gas is equal to or greater than the second set temperature, the controller 70 sets the ignition timing to an optimum ignition timing for exhaust gas reduction S110, sets the intake duration to an intake duration within a predetermined intake duration range S111, and increases the exhaust duration to an optimum exhaust duration for the target exhaust gas reduction and the optimum exhaust duration according to the set intake duration S112.

If the temperature of the exhaust gas is not equal to and higher than the second set temperature, the controller returns to step S106, and sets the exhaust duration to an optimum exhaust duration such that a sum of emission amounts of nitrogen oxides (NOx) and hydrocarbons (HC) according to the set intake duration is minimized S106.

Figure 12:
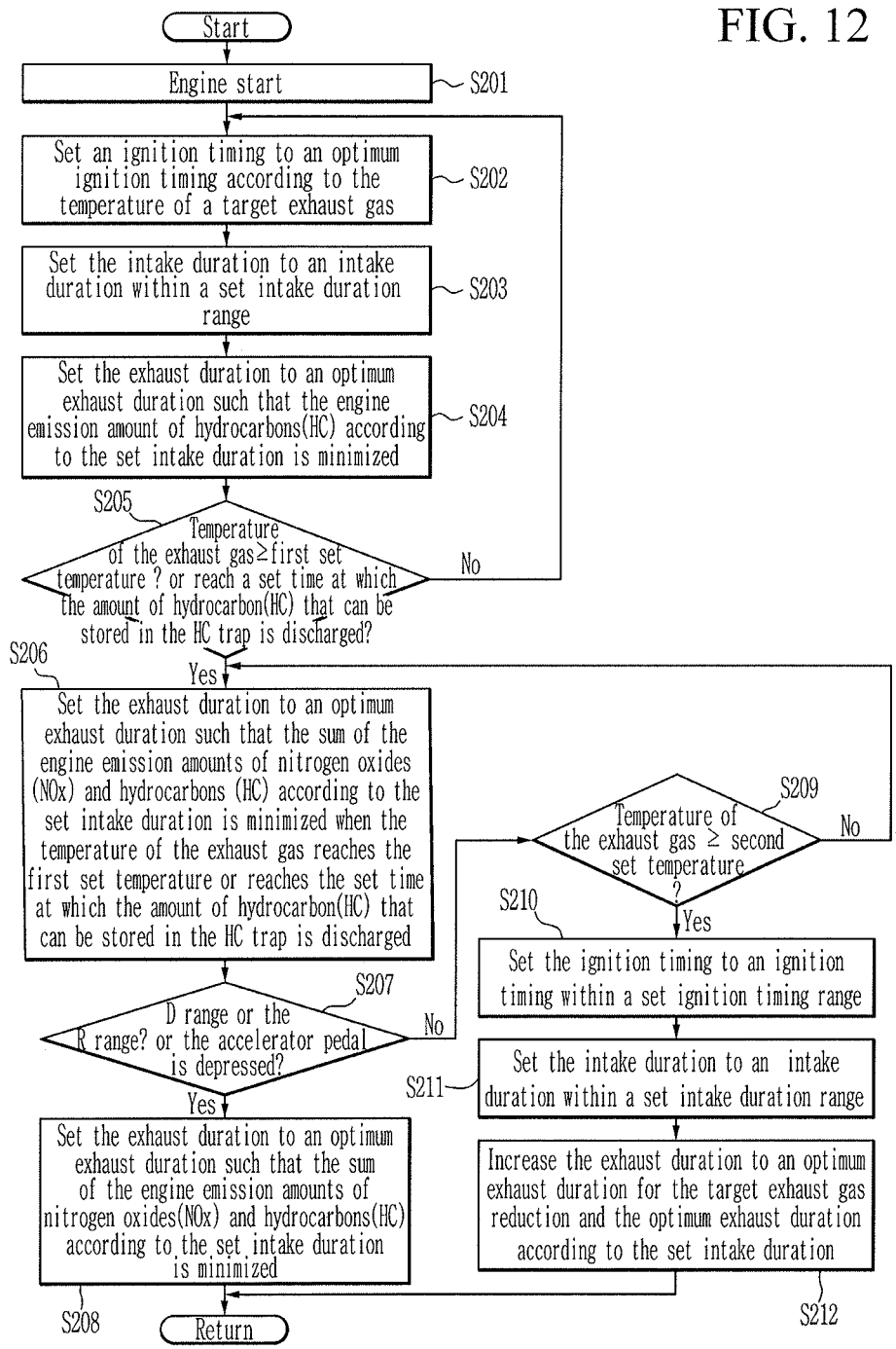
FIG. 12 is a flowchart of a method of controlling an engine according to various exemplary embodiments of the present invention.

Hereinafter, the engine control method according to various exemplary embodiments of the present invention will be described in detail with reference to FIG. 12. FIG. 12 is a flowchart of a method of controlling an engine according to various exemplary embodiments of the present invention. The method of controlling an engine according to various exemplary embodiments of the present invention illustrated in FIG. 12 relates to a method of controlling an engine including a warm-up catalytic converter including a three-way catalyst enhanced with a nitrogen oxide purifying function.

Referring to FIG. 12, firstly, the engine starts S201.

As such, the controller 70 sets an ignition timing to an optimum ignition timing according to a temperature of a target exhaust gas S202, and sets the intake duration to an intake duration within a predetermined intake duration range S203.

As such, the controller 70 sets the exhaust duration to an optimum exhaust duration such that the emission amount of hydrocarbons (HC) according to the set intake duration is minimized S204.

As such, the controller 70 determines whether the temperature of the target exhaust gas reaches a first set temperature or reaches a set time at which the amount of hydrocarbon (HC) which may be stored in the HC trap is discharged S205. Here, the first set temperature is a catalyst activation temperature, and the catalyst activation temperature refers to the temperature of the exhaust gas corresponding to the temperature at which the three-way catalyst starts to be activated (for example, 200° C.).

As such, the controller 70 sets the exhaust duration to an optimum exhaust duration such that a sum of emission amounts of nitrogen oxides (NOx) and hydrocarbons (HC) according to the set intake duration is minimized when the temperature of the target exhaust gas reaches the first set temperature or reaches the set time at which the amount of hydrocarbon (HC) which may be stored in the HC trap is discharged S206.

If the temperature of the exhaust gas does not reach the first set temperature and does not reach the set time at which the amount of hydrocarbon (HC) which may be stored in the HC trap is discharged, the controller 70 returns to step S202 and sets an ignition timing to an optimum ignition timing according to a temperature of a target exhaust gas S202.

As such, the controller 70 determines whether the D range or the R range is selected or the accelerator pedal is depressed by changing the position of the shift lever S207.

When the temperature of the target exhaust gas reaches a first set temperature or reaches a set time at which the amount of hydrocarbon (HC) which may be stored in the HC trap is discharged, and the gear-shifting is detected as the D range or the R range and the accelerator pedal is depressed, the controller 70 sets the exhaust duration to an optimum exhaust duration such that a sum of emission amounts of nitrogen oxides (NOx) and hydrocarbons (HC) according to the set intake duration is minimized S208.

When the gear-shifting is not detected as the D range or the R range and the accelerator pedal is not depressed, the controller 70 determines whether the temperature of the exhaust gas is equal to or greater than a second set temperature S209.

When the temperature of the exhaust gas is equal to or greater than the second set temperature, the controller 70 sets the ignition timing to an optimum ignition timing for exhaust gas reduction S210, sets the intake duration to an intake duration within a predetermined intake duration range S211, and increases the exhaust duration to an optimum exhaust duration for the target exhaust gas reduction and the optimum exhaust duration according to the set intake duration S212.

If the temperature of the exhaust gas is not equal to and higher than the second set temperature, the controller returns to step S206, and sets the exhaust duration to an optimum exhaust duration such that a sum of emission amounts of nitrogen oxides (NOx) and hydrocarbons (HC) according to the set intake duration is minimized S206.

Figure 13:
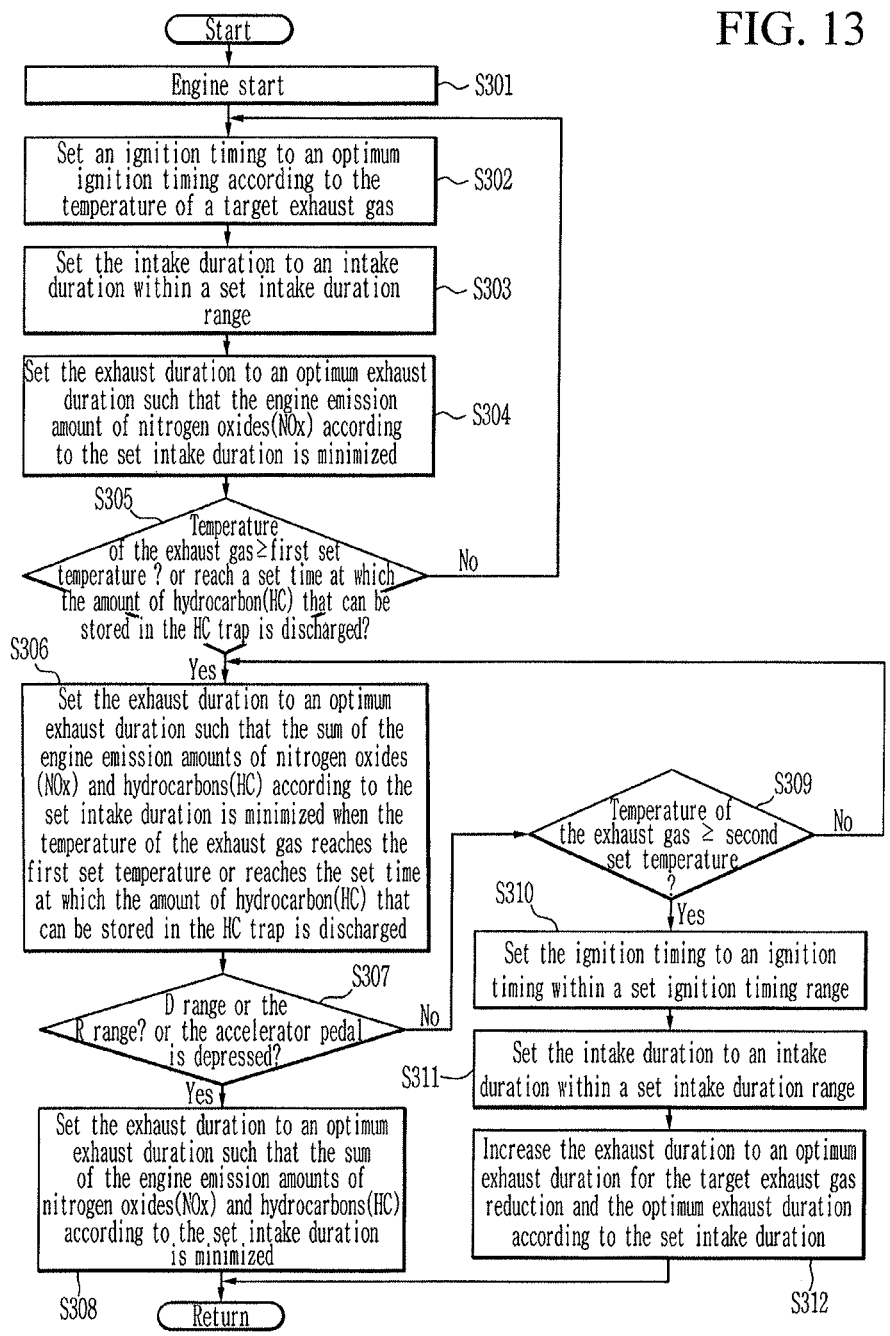
FIG. 13 is a flowchart of a method of controlling an engine according to various exemplary embodiments of the present invention.

Hereinafter, the engine control method according to various exemplary embodiments of the present invention will be described in detail with reference to FIG. 13. FIG. 13 is a flowchart of a method of controlling an engine according to various exemplary embodiments of the present invention. The method of controlling an engine according to various exemplary embodiments of the present invention illustrated in FIG. 13 relates to a method of controlling an engine including a warm-up catalytic converter including a three-way catalyst enhanced with a nitrogen oxide purifying function.

Referring to FIG. 13, firstly, the engine starts S301.

As such, the controller 70 sets an ignition timing to an optimum ignition timing according to a temperature of a target exhaust gas S302, and sets the intake duration to an intake duration within a predetermined intake duration range S303.

As such, the controller 70 sets the exhaust duration to an optimum exhaust duration such that the emission amount of nitrogen oxide (NOx) according to the set intake duration is minimized S304.

As such, the controller 70 determines whether the temperature of the target exhaust gas reaches a first set temperature or reaches a set time at which the amount of hydrocarbon (HC) which may be stored in the HC trap is discharged S305. Here, the first set temperature is a catalyst activation temperature, and the catalyst activation temperature refers to the temperature of the exhaust gas corresponding to the temperature at which the three-way catalyst starts to be activated (for example, 200° C.).

As such, the controller 70 sets the exhaust duration to an optimum exhaust duration such that a sum of emission amounts of nitrogen oxides (NOx) and hydrocarbons (HC) according to the set intake duration is minimized when the temperature of the target exhaust gas reaches the first set temperature or reaches the set time at which the amount of hydrocarbon (HC) which may be stored in the HC trap is discharged S306.

If the temperature of the exhaust gas does not reach the first set temperature and does not reach the set time at which the amount of hydrocarbon (HC) which may be stored in the HC trap is discharged, the controller 70 returns to step S302 and sets an ignition timing to an optimum ignition timing according to a temperature of a target exhaust gas S302.

As such, the controller 70 determines whether the D range or the R range is selected or the accelerator pedal is depressed by changing the position of the shift lever S307.

When the gear-shifting is detected as the D range or the R range and the accelerator pedal is depressed, the controller

70 sets the exhaust duration to an optimum exhaust duration such that a sum of emission amounts of nitrogen oxides (NOx) and hydrocarbons (HC) according to the set intake duration is minimized S308.

When the gear-shifting is not detected as the D range or the R range and the accelerator pedal is not depressed, the controller 70 determines whether the temperature of the exhaust gas is equal to or greater than a second set temperature S309.

When the temperature of the exhaust gas is equal to or greater than the second set temperature, the controller 70 sets the ignition timing to an optimum ignition timing for exhaust gas reduction S310, sets the intake duration to an intake duration within a predetermined intake duration range S311, and increases the exhaust duration to an optimum exhaust duration for the target exhaust gas reduction and the optimum exhaust duration according to the set intake duration S312.

If the temperature of the exhaust gas is not equal to and higher than the second set temperature, the controller returns to step S306, and sets the exhaust duration to an optimum exhaust duration such that a sum of emission amounts of nitrogen oxides (NOx) and hydrocarbons (HC) according to the set intake duration is minimized S306.

Like this, according to exemplary embodiments of the present invention, by controlling the intake duration, exhaust duration and ignition timing of the engine, the amount of emissions contained in the exhaust gas may be reduced. By reducing the amount of emissions entering the three-way catalyst while the three-way catalyst is not warmed up, the amount of emissions exiting the vehicle may be reduced.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system of controlling an engine of a vehicle provided with a dual continuously variable valve duration (CVVD) device, the system comprising:
    the engine including a combustion chamber, an intake valve provided in the combustion chamber for selectively supplying air or a mixture of air and fuel to the combustion chamber, an ignition switch provided in the combustion chamber to ignite a burner to burn the mixture, and an exhaust valve disposed in the combustion chamber to selectively discharge an exhaust gas in the combustion chamber to an outside of the combustion chamber;
    the CVVD provided to adjust an intake duration of the intake valve and an exhaust duration of the exhaust valve;
    a warm-up catalytic converter (WCC) including a three-way catalyst (TWC) for purifying hydrocarbons, carbon monoxide, nitrogen oxides contained in the exhaust gas downstream of the engine;
    a Hydrocarbon (HC) trap disposed downstream of the warm-up catalytic converter for adsorbing and removing the hydrocarbons contained in the exhaust gas;
    an electrically heated catalyst disposed downstream of the HC trap and provided with a heating device;
    a three-way catalyst (TWC) disposed downstream of the electrically heated catalyst for purifying hydrocarbons, carbon monoxide, and nitrogen oxides contained in the exhaust gas; and
    a controller connected to the ignition switch and configured for adjusting an ignition timing of the ignition switch, the intake duration and the exhaust duration based on a driving condition of the vehicle,
    wherein the controller is configured:
        to set the ignition timing to an optimum ignition timing according to a temperature of a target exhaust gas,
        to set the intake duration within a predetermined intake duration range, and
        to set the exhaust duration to an optimum exhaust duration such that a sum of emission amounts of nitrogen oxides (NOx) and hydrocarbons (HC) according to the set intake duration is minimized upon determining that the temperature of the target exhaust gas after the engine is started reaches a catalyst activation temperature or reaches a predetermined time at which an amount of hydrocarbon (HC) that is configured to be stored in the HC trap is discharged.

2. The system of claim 1, wherein the controller, until the temperature of the target exhaust gas after the engine starts is less than the catalyst activation temperature and the amount of hydrocarbon (HC) that is configured to be stored in the HC trap reaches the predetermined time for discharging, is configured to set the exhaust duration to an optimum exhaust duration such that a sum of emission amounts of nitrogen oxides (NOx) and hydrocarbons (HC) according to the set intake duration is minimized.

3. The system of claim 1, wherein the controller, until the temperature of the target exhaust gas after the engine starts is less than the catalyst activation temperature and the amount of hydrocarbon (HC) that is configured to be stored in the HC trap reaches the predetermined time for discharging, is configured to set the exhaust duration to an optimum exhaust duration such that the emission amount of hydrocarbons (HC) according to the set intake duration is minimized.

4. The system of claim 1, wherein the controller, until the temperature of the target exhaust gas after the engine starts is less than the catalyst activation temperature and the amount of hydrocarbon (HC) that is configured to be stored in the HC trap reaches the predetermined time for discharging, is configured to set the exhaust duration to an optimum exhaust duration such that the emission amounts of nitrogen oxide (NOx) according to the set intake duration is minimized.

5. The system of claim 1, wherein the controller, upon determining that the temperature of the exhaust gas after the engine starts is equal to or greater than the catalyst activation temperature or the amount of hydrocarbon (HC) that is configured to be stored in the HC trap reaches the predetermined time for discharging, and upon determining that a gear-shifting is detected as a D range or a R range or an accelerator pedal is depressed, is configured to set the exhaust duration to an optimum exhaust duration such that the sum of emission amounts of nitrogen oxides (NOx) and hydrocarbons (HC) according to the set intake duration is minimized.

6. The system of claim 5, wherein the controller,
upon determining that the gear-shifting is not detected as the D range or the R range and the accelerator pedal is not depressed, is configured to determine when the temperature of the exhaust gas is equal to or greater than a second set temperature, and
upon determining that the temperature of the exhaust gas is equal to or greater than the second set temperature, is configured to set the ignition timing to an optimum ignition timing for exhaust gas reduction, is configured to set the intake duration within a predetermined intake duration range, and is configured to increase the exhaust duration to an optimum exhaust duration for the target exhaust gas reduction and the optimum exhaust duration according to the set intake duration.

7. A method of controlling an engine provided with a dual continuously variable valve duration device, wherein the engine includes an intake valve, an ignition switch, an exhaust valve, and a hydrocarbon (HC) trap, and the dual continuously variable valve duration device is provided to adjust an intake duration of the intake valve and an exhaust duration of the exhaust valve, the method comprising:
setting, by a controller, an ignition timing to an optimum ignition timing according to a temperature of a target exhaust gas when the engine is started;
setting, by the controller, the intake duration within a predetermined intake duration range;
setting, by the controller, the exhaust duration to an optimum exhaust duration such that a sum of emission amounts of nitrogen oxides (NOx) and hydrocarbons (HC) according to the set intake duration is minimized;
determining, by the controller, when the temperature of the target exhaust gas reaches a first set temperature or reaches a predetermined time at which an amount of hydrocarbon (HC) that is configured to be stored in the HC trap is discharged; and
setting, by the controller, the exhaust duration to an optimum exhaust duration such that the sum of emission amounts of nitrogen oxides (NOx) and hydrocarbons (HC) according to the set intake duration is minimized upon determining that the temperature of the target exhaust gas reaches the first set temperature or reaches the predetermined time at which the amount of hydrocarbon (HC) that is configured to be stored in the HC trap is discharged.

8. The method of claim 7, further including:
upon determining that the temperature of the target exhaust gas reaches the first set temperature or reaches the predetermined time at which the amount of hydrocarbon (HC) that is configured to be stored in the HC trap is discharged, determining, by the controller, when a gear-shifting is detected as a D range or a R range or an accelerator pedal is depressed; and
upon determining that the gear-shifting is detected as the D range or the R range and the accelerator pedal is depressed, setting, by the controller, the exhaust duration to an optimum exhaust duration such that the sum of emission amounts of nitrogen oxides (NOx) and hydrocarbons (HC) according to the set intake duration is minimized.

9. The method of claim 8, further including:
upon determining that the gear-shifting is not detected as the D range or the R range and the accelerator pedal is not depressed, determining, by the controller, when the temperature of the exhaust gas is equal to or greater than a second set temperature;
upon determining that the temperature of the exhaust gas is equal to or greater than the second set temperature, setting, by the controller, the ignition timing to an optimum ignition timing for exhaust gas reduction, setting the intake duration within a predetermined intake duration range, and increasing the exhaust duration to an optimum exhaust duration for the target exhaust gas reduction and the optimum exhaust duration according to the set intake duration.

10. A method of controlling an engine provided with a dual continuously variable valve duration (CVVD) device, wherein the engine includes an intake valve, an ignition switch, and an exhaust valve, and a hydrocarbon (HC) trap, and the dual continuously variable valve duration device is provided to adjust an intake duration of the intake valve and an exhaust duration of the exhaust valve, the method of controlling the engine comprises:
setting, by the controller, an ignition timing to an optimum ignition timing according to a temperature of a target exhaust gas, upon determining that the engine is started;
setting, by the controller, the intake duration within a predetermined intake duration range;
setting, by the controller, the exhaust duration to an optimum exhaust duration such that an emission amount of hydrocarbons (HC) according to the set intake duration is minimized;
determining, by the controller, when the temperature of the target exhaust gas reaches a first set temperature or reaches a predetermined time at which an amount of hydrocarbon (HC) that is configured to be stored in the HC trap is discharged; and
setting, by the controller, the exhaust duration to an optimum exhaust duration such that a sum of emission amounts of nitrogen oxides (NOx) and hydrocarbons (HC) according to the set intake duration is minimized upon determining that the temperature of the target exhaust gas reaches the first set temperature or reaches the predetermined time at which the amount of hydrocarbon (HC) that is configured to be stored in the HC trap is discharged.

11. A method of controlling an engine provided with a dual continuously variable valve duration device, wherein the engine includes an intake valve, an ignition switch, an exhaust valve, and a hydrocarbon (HC) trap, and the dual continuously variable valve duration device is provided to adjust an intake duration of the intake valve, and an exhaust duration of the exhaust valve, the method of controlling the engine comprising:
setting, by the controller, an ignition timing to an optimum ignition timing according to a temperature of a target exhaust gas upon determining that the engine is started;
setting, by the controller, the intake duration within a predetermined intake duration range;
setting, by the controller, the exhaust duration to an optimum exhaust duration such that an emission amount of nitrogen oxides (NOx) according to the set intake duration is minimized;

determining, by the controller, when the temperature of the target exhaust gas reaches a first set temperature or reaches a predetermined time at which an amount of hydrocarbon (HC) that is configured to be stored in the HC trap is discharged; and setting, by the controller, the exhaust duration to an optimum exhaust duration such that a sum of emission amounts of nitrogen oxides (NOx) and hydrocarbons (HC) according to the set intake duration is minimized upon determining that the temperature of the target exhaust gas reaches the first set temperature or reaches the predetermined time at which the amount of hydrocarbon (HC) that is configured to be stored in the HC trap is discharged.

* * * * *